US011723317B2

(12) United States Patent
Farchione et al.

(10) Patent No.: US 11,723,317 B2
(45) Date of Patent: Aug. 15, 2023

(54) CONTAINER AND PROCESS

(71) Applicant: Opal Packaging Australia Pty Ltd, Mount Waverley (AU)

(72) Inventors: Frank Farchione, Campbellfield (AU); Fabrizio Macali, Campbellfield (AU); Mark Moore, Campbellfield (AU)

(73) Assignee: Opal Packaging Australia Pty Ltd, Victoria (AU)

( * ) Notice: Subject to any disclaimer, the term of this patent is extended or adjusted under 35 U.S.C. 154(b) by 671 days.

(21) Appl. No.: 16/568,741

(22) Filed: Sep. 12, 2019

(65) Prior Publication Data
US 2021/0076575 A1 Mar. 18, 2021

(51) Int. Cl.
*A01G 9/02* (2018.01)
*B65D 5/00* (2006.01)
*B65D 85/52* (2006.01)
*B65D 5/24* (2006.01)
*B65D 5/20* (2006.01)

(52) U.S. Cl.
CPC .............. *A01G 9/021* (2013.01); *A01G 9/026* (2013.01); *B65D 5/2057* (2013.01); *B65D 5/241* (2013.01); *B65D 85/52* (2013.01)

(58) Field of Classification Search
CPC .......... A01G 9/021; A01G 9/02; A01G 9/026; B65D 5/001; B65D 5/002; B65D 5/0025; B65D 5/003; B65D 5/0035; B65D 5/42
See application file for complete search history.

(56) References Cited

U.S. PATENT DOCUMENTS

| | | | | |
|---|---|---|---|---|
| 1,439,426 A * | 12/1922 | Lemke | ................... | A01G 9/026 47/74 |
| 2,525,268 A * | 10/1950 | Archibald | ................ | B65D 5/22 229/179 |
| 2,540,707 A * | 2/1951 | Beukelman | ............ | A47G 7/085 47/72 |
| 3,306,518 A * | 2/1967 | Connellan | .............. | A01G 9/026 229/116 |
| 3,580,475 A * | 5/1971 | Mobley | ................ | B65D 5/2047 229/117.17 |
| 3,917,156 A * | 11/1975 | Baudet | ................... | B65D 5/003 229/164 |
| 7,870,995 B1 | 1/2011 | Kaltman et al. | | |
| 2003/0024971 A1* | 2/2003 | Jones | ....................... | B65D 5/10 229/109 |
| 2005/0144837 A1* | 7/2005 | Harlow | .................. | A01G 9/026 47/41.01 |

(Continued)

FOREIGN PATENT DOCUMENTS

| | | |
|---|---|---|
| AU | 2014100103 A1 | 3/2014 |
| AU | 2018204778 A1 | 1/2019 |

(Continued)

OTHER PUBLICATIONS

Examination Report for AU Patent Application No. 2019229376 (dated Mar. 31, 2023).

*Primary Examiner* — Kristen C Hayes
(74) *Attorney, Agent, or Firm* — Merchant & Gould P.C.

(57) ABSTRACT

A plant pot, blank for making a plant pot and a process for making a plant pot is provided. The blank and plant pot includes a support disposed a distance from the base wall of the plant pot to support a nesting container.

28 Claims, 11 Drawing Sheets

(56) References Cited

U.S. PATENT DOCUMENTS

| | | | |
|---|---|---|---|
| 2016/0068297 A1* | 3/2016 | Arki | B65D 5/46112 |
| | | | 493/309 |
| 2016/0227712 A1* | 8/2016 | Perez-Vega | A01G 9/026 |
| 2018/0105313 A1* | 4/2018 | Buss | B65D 5/566 |

FOREIGN PATENT DOCUMENTS

| | | | |
|---|---|---|---|
| FR | 2685994 A1 | 7/1993 | |
| FR | 2829357 A1 | 3/2003 | |

\* cited by examiner

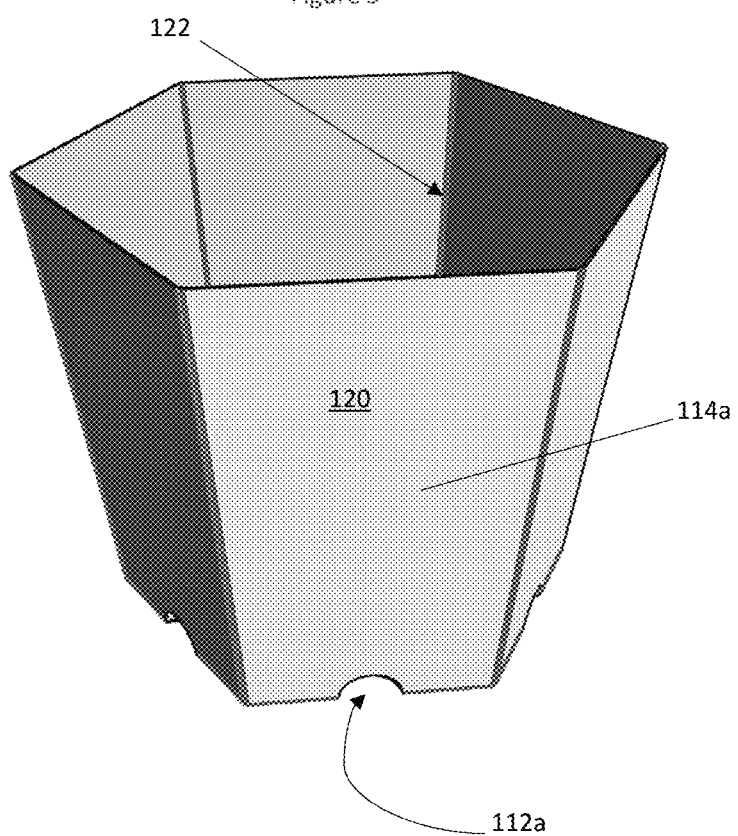
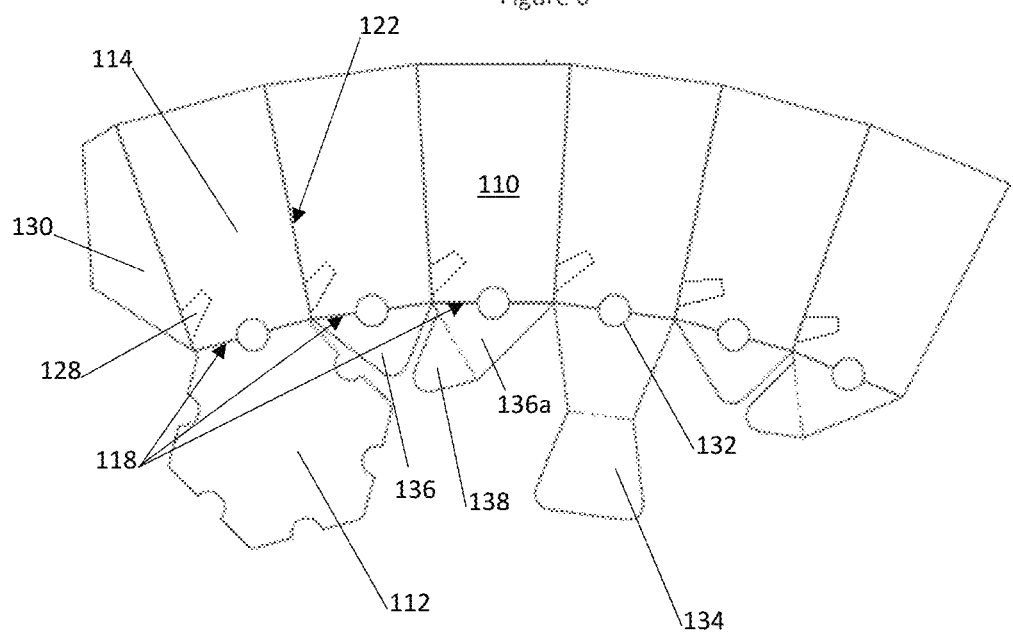

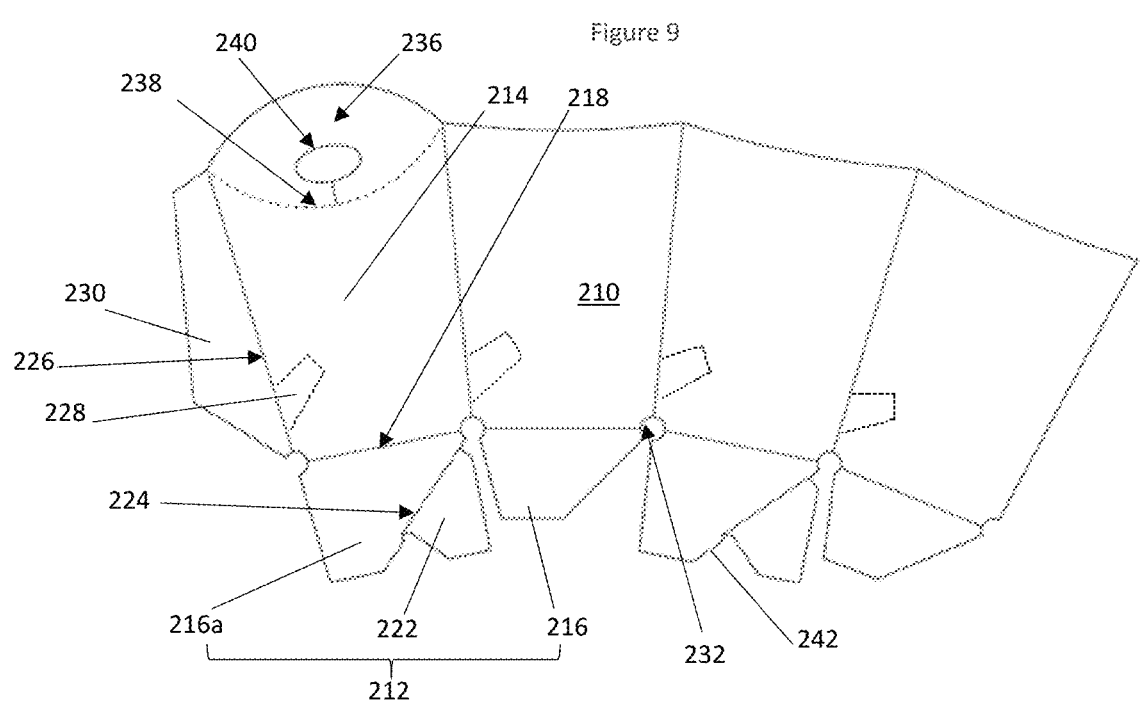

Figure 10

```
Selecting the type of paper, and the thickness
of the sheet of paper based on a notional size
of the container
```

```
Applying a water resistant coating to opposite
sides of the sheet of paper to form a board
```

```
Treating an outer surface of the board that
forms an outside face of the container
```

```
Printing information on the board
```

```
Cutting the board to form the blank
```

```
Forming i) a first panel that forms at least
part of a base wall of the container when
erected into a container, ii) a set of second
panels that extend from the first panel to
form at least part of a side wall of the
container when erected, and iii) a support
being disposed a distance from the base wall
to receive and dispose another container above
the base wall on the blank by forming pre-
creased fold lines and partially perforated or
cut regions on the blank
```

```
Assembling the container
```

```
Extending the support to project into the
container to prevent complete nesting of
stacked containers
```

CONTAINER AND PROCESS

FIELD OF THE INVENTION

The present invention relates to a plant container for plants and a blank for making a plant container. The present invention also relates to a process of making the plant container.

BACKGROUND OF THE INVENTION

There is a range of different plant pots presently available, including ceramic pots, plastic materials, timber barrels and wire baskets. Plastic pots are at present the most popular, which may be the result of a range of factors including plants being able to be propagated and sold in plastic pots, and plastic pots being relatively low cost, light weight and durable. However, once the plant in the plastic pot has been removed from the pot and planted in the ground, disposal of a plastic pot or finding a suitable recycling chain can be difficult for the end consumer. This can have an impact on the environment as most plastic pots are not readily recyclable.

Plant pots may be made of compostable material to reduce its environmental impact at the end of its life cycle. However, one disadvantage of such plant pots is their reduced resistance to degradation by exposure to fluids such as water and moisture. This is undesirable for plant pots which often contain soil that would have to be watered.

It is desirable to provide a plant container alleviates at least one of the above problems.

SUMMARY OF THE INVENTION

An embodiment of the present invention relates to a plant container constructed from a foldable blank, the plant container including:

a base wall, a side wall that extends from the base wall to form a receptacle configured to receive potting mix, and a support extending inwardly from the side wall and spaced a distance above the base wall to receive and space another container above the base wall when the containers are nested together.

The term "plant" embraces any living plant material that requires water and a soil material in which to bed its roots.

Ideally, the blank is integrally formed. Suitably, the integrally formed blank is cut from a single board. The container has an outer face, which will be provided predominantly by an outer face of the blank. Similarly, the inner face of the container will be provided predominantly by the inner face of the blank. References to the inner face of the blank may therefore also refer to the inner face of the container, and vice versa. Similarly, references to the outer face of the blank may therefore also refer to the inner face of the container, and vice versa.

The side wall of the container is configured to facilitate de-nesting of another container nested inside the container.

The side wall may be tapered outwardly moving in a direction away from the base wall. Suitably, the container has an inverted truncated pyramid shape.

The side wall may be separated from the base wall by a first fold line.

The side wall may comprise three or more than three sides.

Each side may comprise a side wall panel. Suitably, the side wall comprises a plurality of side wall panels.

The side wall may include a gusset panel which connects adjacent side wall panels. Suitably, the support is located on the gusset panel.

The plant container may comprise at least two pairs of opposing side wall panels.

The side wall may include four fold lines to form a container comprising four side wall panels. Suitably, the fold lines form an inverted truncated pyramid-shaped container.

The gusset panel may be foldable to attached to a side wall panel in an overlapping arrangement to retain the container in an erected position.

The gusset panel may include an aperture for an adhesive that enables the gusset panel to be connected to the side wall via a single point of attachment when the gusset panel is folded. Suitably, the gusset panel is connected to the side wall by applying an adhesive to either a face of the gusset or side wall panel bound by the aperture.

The gusset panel may include a partially cut region spaced from the base wall which is configured to form the support. In the erected position, the support may be formed by folding the cut region outwardly from the gusset panel such that the support extends into the opening of the container from the side wall. Alternatively, the gusset panel may be cut in a configuration that allows the support to extend into the opening of the container when the gusset panel is attached to a side wall.

The gusset panel may be separated into two sections by a fold line, wherein the support is located on a first section of the gusset panel. Suitably, the gusset panel further includes an aperture for an adhesive in a second section of the gusset panel, in which the aperture enables the gusset panel to be connected to a side panel via a single point of attachment when the gusset panel is folded.

The support prevents one of the containers from being completely received within the other containers when nested. Therefore, when the containers are nested together, an upper portion of the nesting container will protrude above the receiving container, which enables the containers to be more easily de-nested, for example during filling of the container. Advantageously, this reduces the risk of damaging the nested container, for example by tearing, when unpacking the stacked containers.

Locating the support remote to the base wall allows the structural integrity of the base wall to be maintained. In contrast, a support extend at least part way from the base wall typically requires a region of the base wall to be perforated or cut in order to accommodate the support. This would likely weaken the structural integrity of the base wall, for example by wicking when the base wall is exposed to fluids.

The support may be spaced from the base wall by a spacing of 5 to 15 mm, and ideally 10 mm from the base wall.

The support may extend from a side wall panel or a gusset panel of the plant container.

The support may be located about a fold line located between two side wall panels. That is, the support may be located on the fold line or in the vicinity of the fold line.

The support may extend from the fold lines of the side wall. Suitably, the support extends from between the side panels of the side wall.

The support may extend towards an opening of the plant container.

The plant container may include a pair of diametrically opposing supports. This arrangement distributes the weight of the nested container evenly onto the supports to reduce the load on each support. Suitably, the plant container may include two pairs of opposing supports.

The support may be a projection such as a tongue, tab, ear or the like extending inwardly from a side wall of the container. Suitably, the support is formed from a partially cut or perforated region on a side wall panel or a gusset panel.

The support may be positioned such that the base of a nesting container rests on an edge of the support of a receiving container. This reduces the surface area of the base of the nesting container contacting the support to facilitate de-nesting. This may also reduce exposure of the support of the receiving container to fluid flowing from the nesting container.

When the containers are located in a nesting position, the support contacts the base wall of another container so that the assembly of the containers can be formed in which the nesting container is not completely received inside the receiving container.

The container may include drainage holes for draining water from the container. Water drainage is important to prevent the roots of the plant from drowning or rotting. The draining holes may be located on either one or both of the side wall or the base wall.

At least part of the drainage hole may be located on the side wall. Suitably, the side wall has four side panels which define four corners, and a drainage hole is provided at each corner. Additional drainage holes may be provided at the interface of the side wall and the base wall.

The drainage holes may be formed as a cutout in the blank, and the paper layer will be directly exposed to moisture ingress at the cutout, for example, over the thickness of the blank.

The side wall of the container may include an attachment flap that is adhered to an adjacent side wall panel in an overlapping arrangement to retain the container in the erected position. A user can detach the attachment flap from the side wall panel to open the side wall of the container. The side wall of the container may include a line of weakness that can be torn to open the side wall of the container. The line of weakness may extend from an outer end of the side wall toward the base wall. In one embodiment, the line of weakness may extend the length of the side wall.

By opening the side wall panel, a user can remove the plant from the container with no or minimal root disruption.

The side wall of the container may comprise a plurality of side wall panels, of which there are suitably four side wall panels, and a detachable panel.

A line of weakness may be located between the detachable panel and the side wall panel. Suitably, the line of weakness may be cut or torn.

The side wall panels may include a taller side wall panel that extends above the other side wall panels when the container is in an upright orientation. The taller side wall panel may include an opening configured for carrying the container. The opening may be sized as a finger hold or a hand hold. In one example, the opening for carrying the container may be provided in the detachable panel.

Moreover, either one or both of the side wall and the detachable panel may have the following types of information or directions:
  i) labelling information such as the type or variety of the plant of the container;
  ii) care instructions for the type of plant of the container;
  iii) images or photographs of the plant in the container;
  iv) directions on how to use the container; and
  v) directions on how deep to bury the container in the ground, and the amount of sunlight and watering required by the plant.

The base wall of the container may include a set of overlapping flaps. In particular, the base wall includes base flaps extending from each side wall panel, and when erected, the base flaps are oriented in an overlapping manner whereby each flap extends from inside to outside the container, and a part of the flap located inside the container is at least partially overlapped by part of an adjacent flap located outside the container.

The container may also have a lip formation extending about the side wall of the container. For example, the lip formation may extend outwardly from the side wall.

Another embodiment of the present invention relates to a foldable blank for making a plant container, the blank including:
  a first panel that forms at least a part of a base wall of the container when erected into a container, and
  a set of second panels that extend from the first panel to form a side wall of the container, and when assembled, the second panels and the first panel form a receptacle for receiving potting mix, wherein the blank includes a region spaced from the first panel that is configured to form a support to receive and dispose another container a distance from the base wall.

The blank may have three or more second panels that extend from the first panel. Suitably, each of the second panels extends from a first fold line formed on a side of the first panel.

The side wall may comprise adjacent second panels connected by a gusset panel. Suitably, the support is located on the gusset panel. The gusset panel may include a partially cut region spaced from the first panel which is configured to form the support.

The gusset panel and the second panels may be integrally formed.

Two embodiments of the blank will now be described. In one embodiment, the first panel has four sides, and the blank includes four second panels that extend from the sides of the first panel. Suitably, each of the second panels extends from a first fold line on a side of the first panel. In other words, the first panel may be centrally located and the second panels may be arranged about the first panel.

The gusset panel may be separated into two sections by a fold line, wherein the support is located on a first section of the gusset panel and an aperture is located on a second section of the gusset panel that enables the gusset panel to be connected to a side wall panel via a single point of attachment when the gusset panel is folded.

The gusset panels may be equally sized and extend from the second panels. Suitably, each gusset panel is separated from the second panel by a second fold line. Each gusset panel may form sections separated by a third fold line.

The gusset panel sections may concertina relative to each other when the blank is erected.

The blank may also include a partially cut region spaced from the first panel which is configured to form the support. Suitably, the partially cut region is located on a gusset panel.

The blank may also include lip flaps extending outwardly from the second panels, the lip flaps forming a lip formation that extends about the side wall of the container erected from the blank.

The blank may also include drainage openings for draining water poured into the container. The drainage openings may be located at corners of the first panel. Suitably, the drainage openings are located at an intersection of any one or more of: i) a corner of the first panel that is adjacent second panels, ii) the first and second panels and iii) the gusset panels interconnecting adjacent second panels.

The drainage openings may span the first and second panels.

The second panels may have a width in a direction transverse to the length of the second panels.

In a second embodiment, the blank includes a line of the second panels arranged side-by-side in which adjacent second panels are separated by second fold lines, and the first panel is separated from a second panel by a first fold line.

The blank may have four second panels. Ideally, the blank has six second panels.

An attachment flap may extend from one end of the line of the second panels, and the attachment flap is attached to the second panel at an opposite end of the line of the second panels to form a closed side wall during assembly of the blank. The closed side wall can then be moved between a flat collapsed position and an erected operative position. When the second panels are located in an erected position, the side wall can form a receptacle with the base wall.

The first panel may have a number of sides that equals the number of the second panels.

The first panel may include a set of base flaps that extend from the second panels. The base flaps may be configured so that at least one of the base flaps extends from the base of the second panels and can be arranged in a partially overlapping configuration that moves into an operative position to form the base wall as the closed side wall of the container is moved from the collapsed position to an operative position.

The support may extend from at least one of the second panels at a location spaced from the first panel. Suitably, at least one second panel includes a partially cut region spaced from the base wall which is configured to form a support.

In an embodiment, the side wall of the container may include four side wall panels, in which an attachment flap extends from one of the side wall panels and is attachable to another side wall panel to form a closed side wall that can be moved between a collapsed flattened position, with the attachment flap connected, and an erected operative position. The base wall includes a set of overlapping flaps in which one of the flaps extends from each side wall panel, and the overlapping flaps move into an operative position when the closed side wall moves from the collapsed position to the erected position.

The side wall may be opened by a user by either detaching the attachment flap or breaking a line of weakness that extends longitudinally along the side wall that can be broken to open the side wall into an opened flat configuration.

At least one of the second panels may include a detachable panel that forms part of the side wall of the container made from the blank. A line of weakness may be located between the detachable panel and one of the second panels. The line of weakness may be cut or torn.

Another embodiment relates to a plurality of nested plant containers constructed from a foldable blank, the assembly comprising a receiving container and a nesting container, wherein:
the receiving container comprises:
a base wall,
a side wall that extends from the base wall to form a receptacle configured to receive a plant, and
a support extending inwardly from the side wall and being disposed a distance from the base wall,
wherein the nesting container rests on the support of the receiving container to be spaced above the base wall of the receiving container.

Another embodiment also relates to a process of making a process of making a plant container from a foldable blank, the process including:
cutting a blank from the foldable blank;
forming i) a first panel that forms at least part of a base wall of the container when erected into a container, ii) a set of second panels that extend from the first panel to form at least part of a side wall of the container when erected, and iii) a support being disposed a distance from the base wall to receive and dispose another container above the base wall when the containers are nested together, on the blank;
folding the second panels relative to the first panel into an operative position to form a receptacle for receiving potting mix; and
extending the support inwardly from the side wall into the container.

The forming step may include forming a first fold line between a first panel and a second panel.

The forming step may include forming second fold lines between second panels in a line.

The forming step may include forming second fold lines that form a gusset panel between adjacent second panels.

The forming step may include forming a third fold line on the gusset panel to form two sub gusset panels or gusset sections.

The forming step may include partially cutting a region of a panel of the side wall to form the support. Suitably, the forming step includes partially cutting a region of the second panel or the gusset panel to form the support.

The forming step may include folding the gusset panel relative to the second panel to extend the support from the side wall.

The folding step may include forming an aperture for an adhesive on the gusset panel that enables the gusset panel to be connected to a second panel via a single point of attachment when the gusset panel is folded.

The forming step may include forming a line of weakness that defines a detachable panel in the second panels.

The forming step may include forming drainage openings. The drainage openings may be located at the junction between the side wall and the base wall. Ideally, eight drainage openings are formed.

The extending step may include folding the partial cut region of the second panel or the gusset panel to extend the support inwardly into the receptacle.

The extending step may occur together with the folding step.

The process may include folding the gusset panel relative to the second panel. Suitably, the support extends from the side wall when the gusset panel is folded relative to the second panel.

The process may include attaching the gusset panel to the second panel to move into the operative position. Suitably, the step of attaching the gusset panel to the second panel including applying an adhesive to either the gusset panel or second panel within the bounds of the aperture.

The process may also include a step of selecting the thickness of a sheet of paper depending on the size of the container to be formed. For example, a container having a cross-section or diameter ranging from 2 to 6 inch may have a thickness in the range of 350 µm to 750 µm.

The process described herein may include any one or a combination of the features of the blank, and/or the plant container described herein. Similarly, the blank may include any one or a combination of the features of the process and/or the container, and the container may include any one or a combination of the features of the blank and/or the process described herein.

BRIEF DESCRIPTION OF THE DRAWINGS

Embodiments of the present invention will now be described with reference to the accompanying figures, of which:

FIG. 5 is perspective view of a plant container according to yet another embodiment of the invention.

FIG. 6 is blank that can be erected to form the container shown in FIG. 5.

FIG. 9 is blank that can be erected to form the container shown in FIG. 8.

FIG. 10 is a block diagram illustrating process steps according to one embodiment of the invention for making the container shown in any one of the FIGS. 1 to 9.

FIG. 14 is an arrangement of foldable blanks, of the type shown in

FIG. 9, on a board.

DETAILED DESCRIPTION

Figure 1:
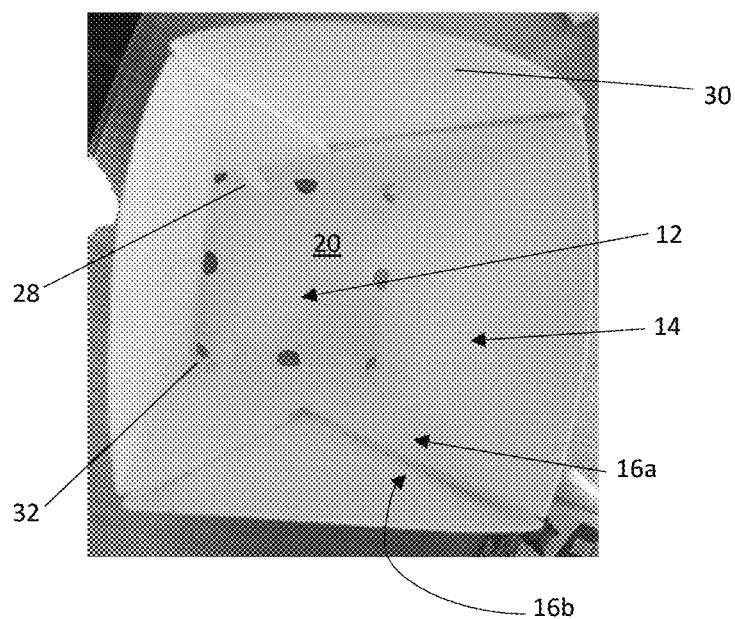
FIG. 1 is a top view of a plant container according to an embodiment of the invention.

A preferred embodiment of the present invention will now be described in the following text with reference to the accompanying figures. The text also includes reference numerals to help identify corresponding features in the figures. However, to maintain clarity of the figures, not all reference numerals are included in each figure.

The preferred embodiment of the present invention relates to a blank 10, plant container 20, and a process for making the plant container 20 that, amongst other things, comprises a foldable blank.

Figure 2:
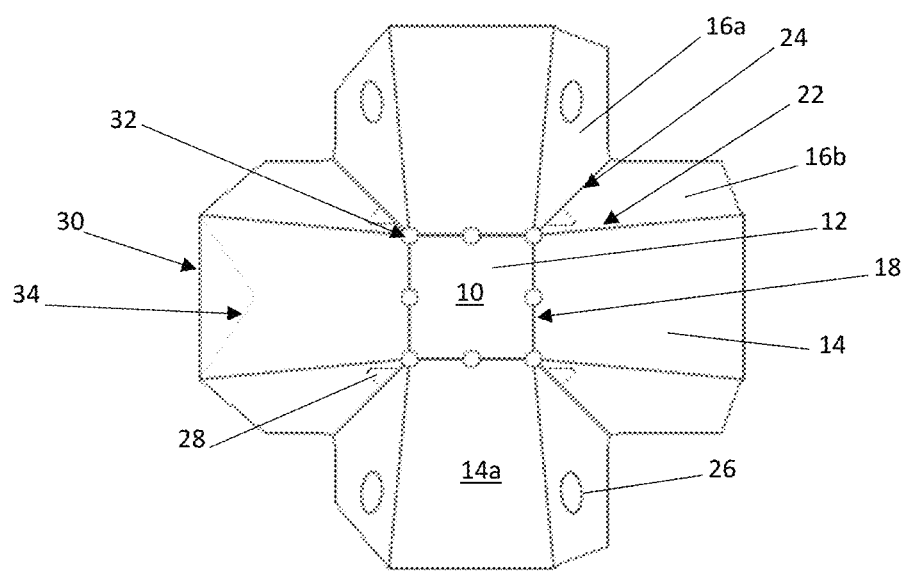
FIG. 2 is a blank that can be erected to form the container shown in FIG. 1.

FIG. 1 is a perspective view of a plant container 20 and FIG. 2 illustrates the blank 10 that is folded to make the plant container 20. The blank 10 and container 20 are made from a board including a core sheet of paper and water resistant coatings/layers as described herein.

Figure 11:
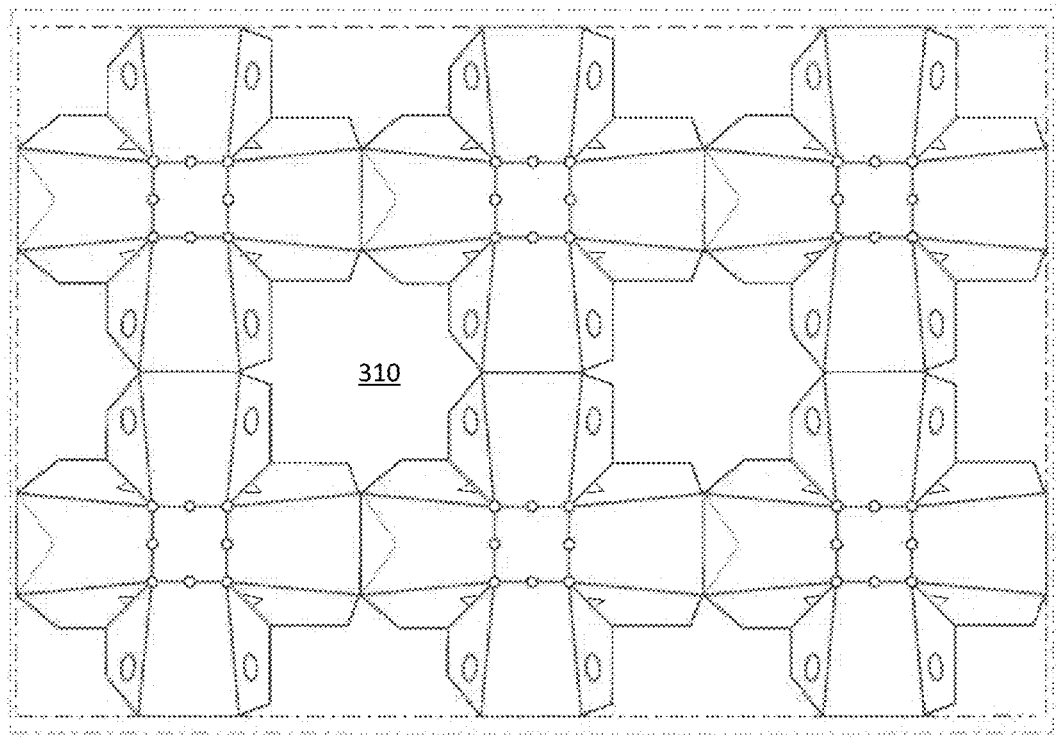
FIGS. 11, 12 and 13 illustrate different arrangements of foldable blanks, of the type shown in FIG. 2, on a board.
Figure 11A:
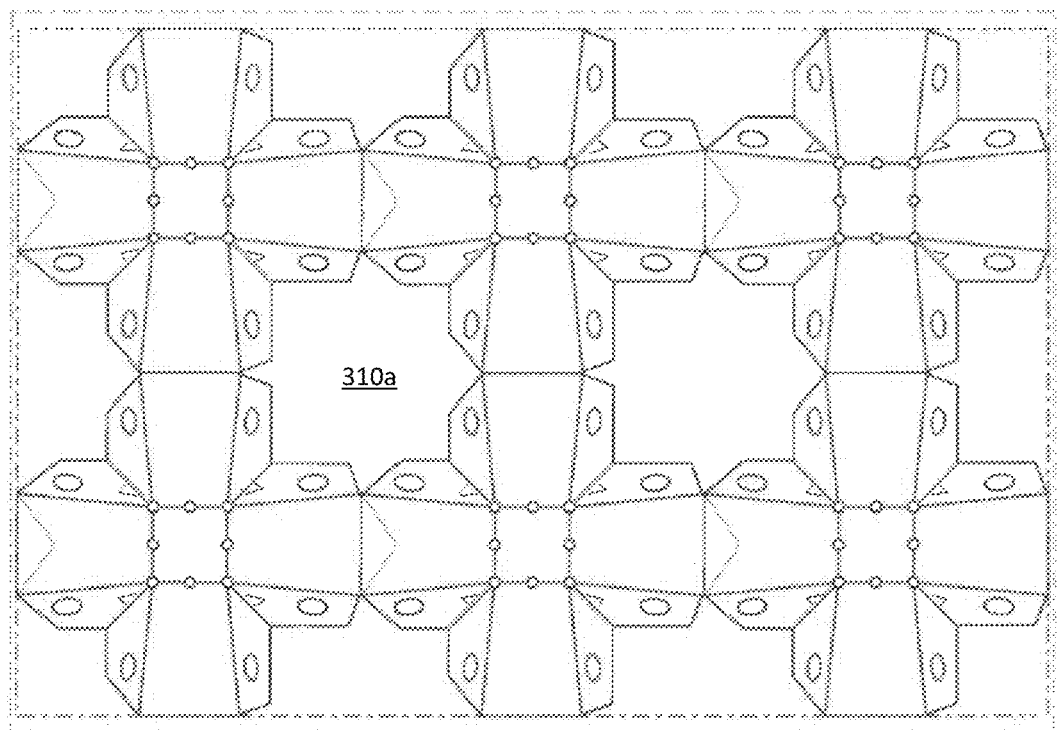
FIGS. 11a, 12a and 13a illustrate different arrangements of foldable blanks, of the type shown in FIG. 2a, on a board.
Figure 12:
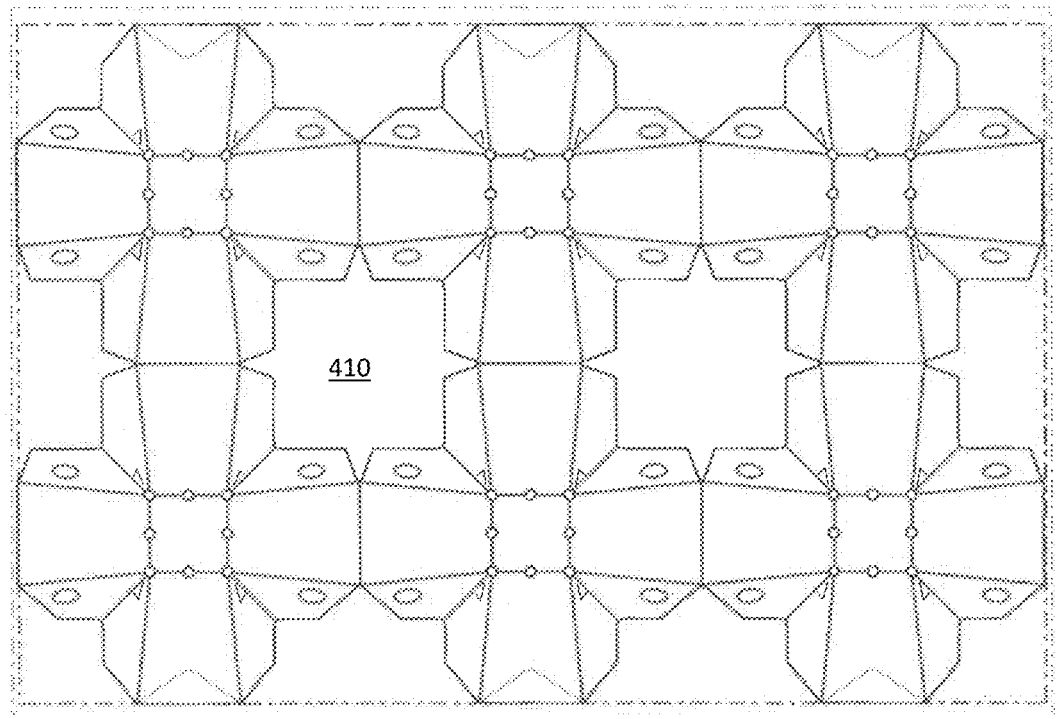
Figure 12A:
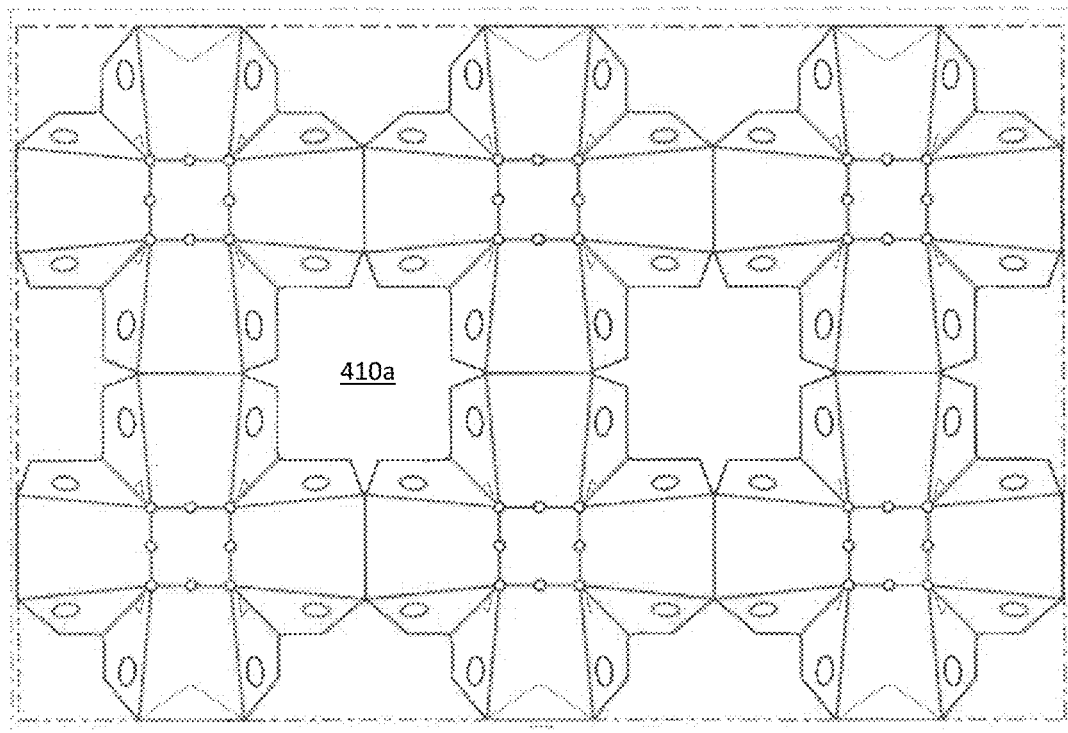
Figure 13:
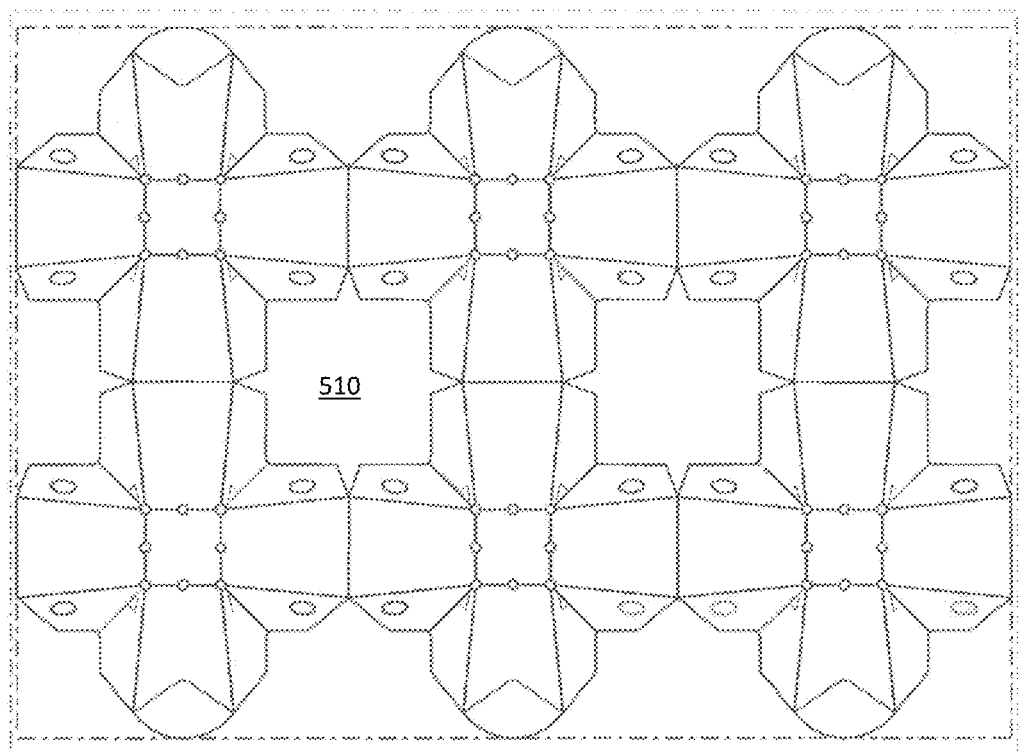
Figure 13A:
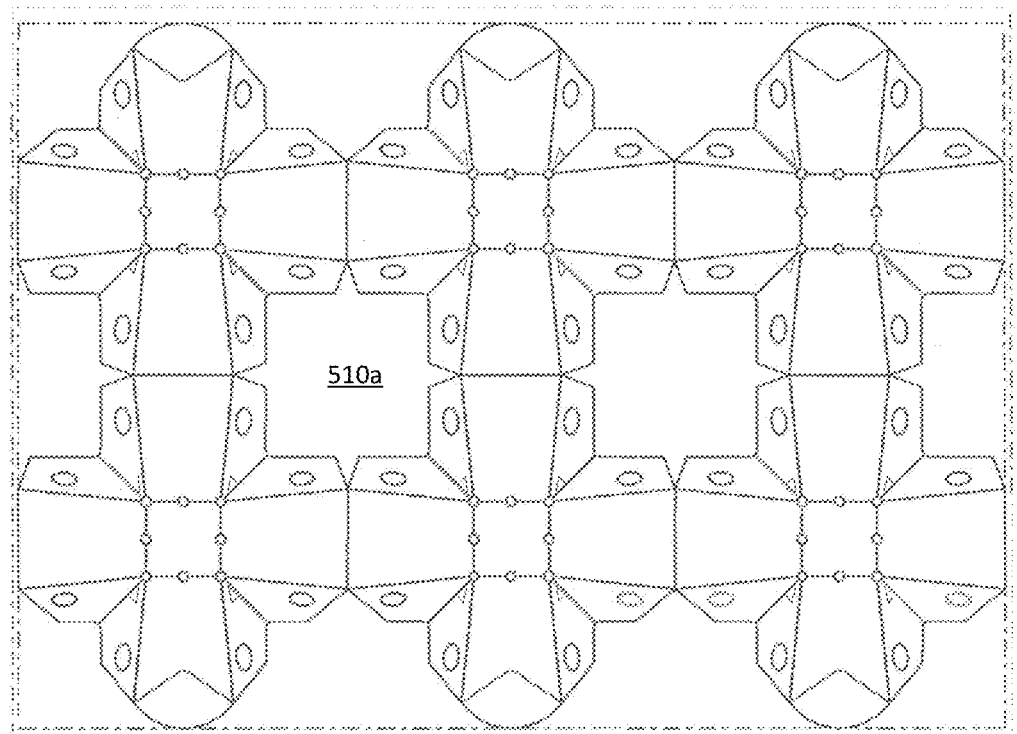

The blank 10 may be printed on a board in a variety of different arrangements to minimise wastage. FIGS. 11, 12 and 13 show examples of possible arrangements of blank 10 on boards 310, 410 and 510. FIGS. 11a, 12a and 13a show the same arrangements on a different blank 10a on boards 310a, 410a and 510a.

The board may be a laminated board with an inner paper layer and water-resistant layers on opposite sides of the paper layer that inhibits ingress of water to the paper layer. This allows the container to retain structural rigidity when exposed to fluids such as water or moisture, for example when a plant is located in the container.

The water resistant coating may be made of any suitable polymeric material. The water resistant coating enables a plant to be propagated and watered in the container 20 and the container 20 retains an acceptable rigidity for a period, such as at least 3 months, and ideally at least 6 months with the plant in the container.

The paper layer and the water-resistant layers may comprise any number of sub-layers. Moreover, the board may also contain one or more other additional layers, such as, natural fibre, or even metallised foil. Ideally, the board consists of the inner paper layer and the water-resistant layers are bonded directly to opposite sides of the paper layer.

The paper layer of the board ideally has limited water wicking properties. Ideally, the paper layer is a paper board material having a thickness in the range of 350 to 750 μm.

The thickness of the board may be selected based on the size of the container. For example, a container of notional diameters may have a board, which is principally determined by the thickness of the paper layer in accordance with the following table:

TABLE 1

| Notional container cross-section or diameter | Thickness of the paper layer |
| --- | --- |
| 2 to 3 inch container | 350 μm to 400 μm |
| 3 to 4 inch container | 450 μm to 550 μm |
| 4 to 6 inch container | 550 μm to 750 μm |

The water resistant layers applied to opposite faces of the paper layer may be made of a polymeric film, for example a polyolefin. The water-resistant layers may be a film such as a polypropylene film (PP) including BOPP film, polyethylene film (PE), polyester film, nylon film, a film comprising polymers derived from plant materials such as corn, sugar cane, and so forth. Plant material can be used as a source of ethanol, which is a precursor to an ethylene monomer in the manufacture of polyethylene.

Suitably, the water resistant layer is a neat polyolefin resin without any additives. However, additives may be added to increase shelf-life.

Ideally, the water-resistant layers are low density polyethylene (LDPE) films and/or high density polyethylene (HDPE) films. In one example, at least one of the water-resistant layers is 100% LDPE. In one example, at least one of the water-resistant layers is 100% HDPE. In another example, at least one, and suitably both of the water-resistant layers is a LDPE/HDPE blend range from 25/27 to 72/25 wt. %. Typically, the water-resistant layer has a 50/50 blend of HDPE/LDPE.

The water-resistant layer may be applied to the paper layer using any suitable technique including printing, extrusion coating, or adhesion coating, for example, using a suitable adhesive between the paper layer and the water-resistant layers.

The characteristics of the water-resistant layer on the inner face of the plant container or blank may differ from characteristics of the water-resistant layer on the outer face of the container or blank. For example, the water-resistant layer on the inner face of the container may have a higher weight (for instance grammage per area) than on an outer face of the container. In another example, the thickness of the water-resistant layer of the outer face may be greater than the thickness of the water-resistant layer of the outer face.

Alternatively, the water-resistant layer on an outer face of the container has the same characteristics as the inner face of the container.

Ideally, one of the water-resistant layers forms an outer face of the container, and the water-resistant layer includes pigmentation to obscure from view the paper layer about the drainage hole. For example, the water-resistant layer may be pigmented white which obscures from view water staining of the paper layer about the drainage hole.

The outer face of board may also be subjected to a surface altering treatment, such as a corona treatment, to increase surface tension and to improve adhesion of ink, glue or other substances thereto. The treatment may, for example, be a corona treatment. Other examples include a flame treatment.

The polymer layers may have any suitable thickness but typically each polymer layer has a thickness in the range of 10 μm to 35 μm. Ideally, the polymer layer is applied to an inner surface of the board, and therefore is located on the inside of the container. The polymer layer is ideally a clear 50/50 blend of HDPE/LDPE with a thickness in the range of 10 to 25 μm, which equates to a weight in the range of 9 to 20 gsm.

The polymer layer applied to an outer surface of the board, and therefore is located on the outside of the container. The polymer layer is ideally a 50/50 blend of HDPE/LDPE having a thickness in the range of 15 to 35 μm, which equates to a weight in the range of 13 to 30 gsm.

At least one of the outer and inner polymeric layer also contains a white pigment, such as 8 to 15 wt. % titanium dioxide. Ideally, both the outer and inner polymeric layers contain a white pigment, such as 8 to 15 wt. % titanium dioxide. The pigment has the benefit of obscuring from view staining of the paper layer, for example, at the edges of the paper layer about the drainage holes, at the top and bottom edges of the board or at the soil line.

The paper layer of the board may range from 80 to 97 wt. % of the board. Even more ideally, the paper layer ranges from the 85 to 95 wt. % of the board, and even more suitably the paper layer is 90 wt. % of the board. The remainder of the board may comprise the water-resistant layers. The board as described above has a paper content of about 90 wt % and a polymeric content of about 10%, which enables the containers to be recycled with other conventional boards.

The plant container may include biodegradable material which conforms to one or more of ASTM5511, ASTM64000, EU13432 and AS4736. Suitably, the biodegradable material forms part of the water-resistant layer/coating.

The biodegradable material may comprise 1-3 wt % of the composition used to form the water resistant layer.

The biodegradable material may be derived from sugarcane and/or starch blends.

The biodegradable material may be selected to break down under anaerobic high solids industrial landfill conditions.

The biodegradable material may be a plant derived additive.

Suitably, the additive is a plant derived polymer. More suitably, additive is a mixture of aliphatic aromatic esters and polylactide, organoliptic, monosaccharides and aldohexose compositions.

Examples of suitable additives include polybutylene succinate, a mixture of aliphatic aromatic esters and polylactide, organoliptic, monosaccharides and aldohexose compositions, Biosphere Plastic, Bioplastics BioPBS, Ecopure additive, and biobased or renewable bioplastic polymers including greenLDPE, PLA, PET and PTT polymers.

One advantage of biodegradable material is that degradation of the water resistant coating does not occur until the material is in the ground whereby microbes that exist under Anaerobic High Solids Soil conditions target and breakdown the biodegradable material. Testing has been completed indicating greater than 92% breakdown to biomass in 12 months under conditions outlined in ASTM5511.

Figure 3:
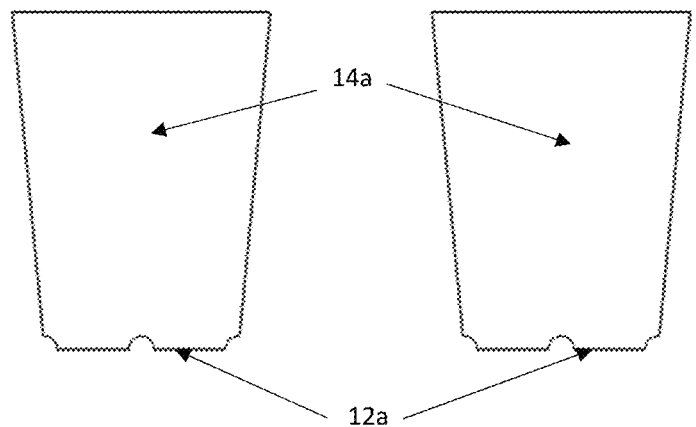
FIG. 3 is a side view of the plant container shown in FIG. 1.

The blank 10 and container 20 have a first panel 12 for forming the base wall 12a of the container 20 and a set of second panels 14 for forming the side wall 14a of the container 20 (see FIG. 3). The base wall 12a is square with first fold lines 18 along each side of the base wall 12a that separate the base wall from the second panels 14.

Gusset panel sections 16a/16b are located between adjacent side wall panels 14a and are separated from the side wall panels 14a by second fold lines 22. It can be appreciated that in other embodiments, the gusset panels may be a singular panel located between adjacent side wall panels.

In FIG. 2, the pair of gusset panels sections 16a/16b are separated by a third fold line 24 that enables the gusset panels 14 to concertina relative to each other when the blank is folded into an erected position in which the second panels 14 extend upwardly from the base panel 12 as shown in FIG. 3. An adhesive is used to fix the gusset panels on an inner face of the side walls 14a of the container 20. In an alternative embodiment, the third fold line 24 may be a cut formed in the blank 10 which may enable the gusset panel sections 16a/16b to extend from one of the second panels to be folded over an adjacent second panel 14 and fixed in position using an adhesive.

An aperture 26 is located on gusset panels 16a flanking side wall panels 14a to demarcate a location on side wall panel 14a on which an amount of adhesive may be applied to adhere gusset panel 16b (and consequently pin gusset panel 16b) to an inner face of side wall panel 14a. This allows both gusset panels 16a and 16b to adhere onto side wall panel 14a using one application of adhesive. In contrast, multiple applications of adhesive are required to adhere gusset panel 16a and gusset panel 16b to side wall panel 14a without the aperture.

Figure 2A:
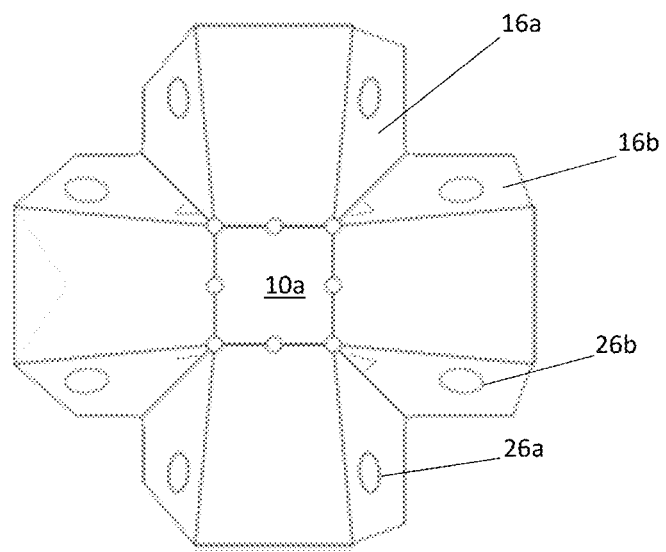
FIG. 2a is another form of a blank that can be erected to form a plant container according to another embodiment of the invention.

FIG. 2a shows an alternative embodiment in which the blank 10a has holes 26a and 26b present on the gusset panels 16a and 16b, respectively. In this embodiment, both gusset panels 16a and 16b are adhered onto side wall panel 14a by applying a line of adhesive on a surface of each gusset panel 16a and 16b, adhering gusset panel 16a to gusset panel 16b, and adhering gusset panel 16b to side wall panel 14a.

Figure 4:
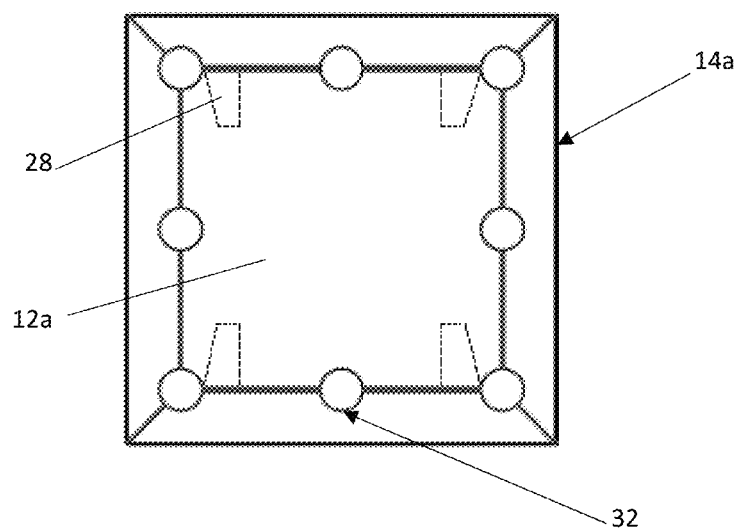
FIG. 4 is a top view of the plant container shown in FIG. 1.

In a first embodiment, a first set of four drainage holes 32 are located so as to overlie a junction of the corner of the first panel 12, corners of adjacent second panels 14, and corners of the gusset panels 16a/16b. In a second embodiment, a second set of four drainage holes 32 may be arranged so as to overlie a junction of the fold line separating the first panel 12 and the second panel 14. In a third embodiment, the container 20 may comprise a combination of first and second sets of drainage holes 32 (FIG. 4).

The container 20 also includes two pairs of supports 28 that are diametrically opposed and located a distance from the base wall. The supports 28 are arranged to prevent nesting container 20 from being completely nested inside a receiving container 20 (i.e. to prevent the base walls of both containers from contacting each other). Specifically, the base wall 12a of a nesting container 20 is intended to contact the supports 28 of the receiving container 20, such that a top section of the side wall 14a of the nesting container 20 protrudes above the side wall 14a of the receiving container 20.

Having the support located away from the base wall maintains the structural integrity of the base wall because modifications to the base wall such as perforations or cuts can be avoided to accommodate the support. It also reduces exposure of the support to fluids such as water and moisture that tend to accumulate at the base of the container. This increases the durability and consequently the lifespan of the support.

Each support 28 comprises a tongue or tab or ear located on the gusset panel 16b. The tongue/tab/ear comprises at least two perforated edges that extend from fold line 24. The tongue/tab/ear can be released from the perforated edges to pivot about fold line 24 such that when assembled, the tongue/tab/ear extends from the side wall 14a into the container. When alike containers 20 are stacked one inside the other, the tongue/tab/ear of the receiving container 20 supports a nesting container 20. Ideally, the supports 28 are arranged at a spacing of approximately 5 to 15 mm above the base wall, and ideally approximately 10 mm.

As can be seen, the width of the second panels 12 increases in a direction away from the base wall 11 so that the side wall of the container 20 tapers outwardly. This forms an inverted truncated pyramid shaped container.

Although not shown in FIGS. 1 and 2, the side wall 14a of the container 20 may also include a line of weakness that can be torn by hand or cut to enable the side wall 14a to be opened. This can facilitate easier removal of the plant from the container 20 for planting. The line of weakness 34 may also define a removable panel 30 which can be retained by the consumer. The removable panel 30 may include information such as information about the plant and directions or use.

In addition, the side wall 14a of the container 20 may include printed information, including directions of use and horticultural information on the plant. The information can be printed with ink by any suitable means.

FIG. 5 illustrates an embodiment of a hexagonal container 120 and FIG. 6 illustrates a blank 110 for making the hexagonal container 20. The container 120 and blank 110 for making the container 120 shown in FIGS. 5 and 6 may be made from the board having a core paper layer and water resistant coatings on opposite faces described herein. The blank 110 has a first panel 112 for forming the bottom wall 112a of the container 120 and a line of second panels 114 that when erected, form the side wall of the container 120. The first panel 112 is extends from the lower edge of one of the second panels 114 via first fold line 118. The second panels 114 are separated by the second fold line 122. A first attachment flap 130 extends from the second panel 114 at one end of the line of panels 114 which can be attached to the second panel at the opposite end of the line of second panels 114 when the blank 110 is erected.

A second attachment flap 134 also extends from the lower edge of the opposite second panel 114 of the container which provides support for the first panel 112. The second attachment flap may be connected to the first panel 112 using an adhesive, or alternatively, provide support without being fixed to the base wall of the container.

The container 120 also includes supports 128 formed from partially cut regions on two or more second panels 114. In FIG. 6, the partially cut regions are located on each of the second panels 114 and distal to the first panel 112. Each partially cut region is foldable to form a ear that pivots at or near second fold line 122 and extends into the container.

In one embodiment, the container 120 includes pairs of supplementary flaps 136, 136a that extend from the second panels 114 via fold lines 118. One supplementary flap of each pair comprises a base panel 136a and a support panel 138, while the other supplementary flap comprises a base panel 136 only. The support panel 138 can be folded relative to the base wall 112 to provide a stop formation that can be engaged when another container is stacked inside the container 120.

Drainage holes 132 are also provided part way along the first fold line 118 on each of the second panels 114 which is best seen in FIG. 6.

Figure 7:
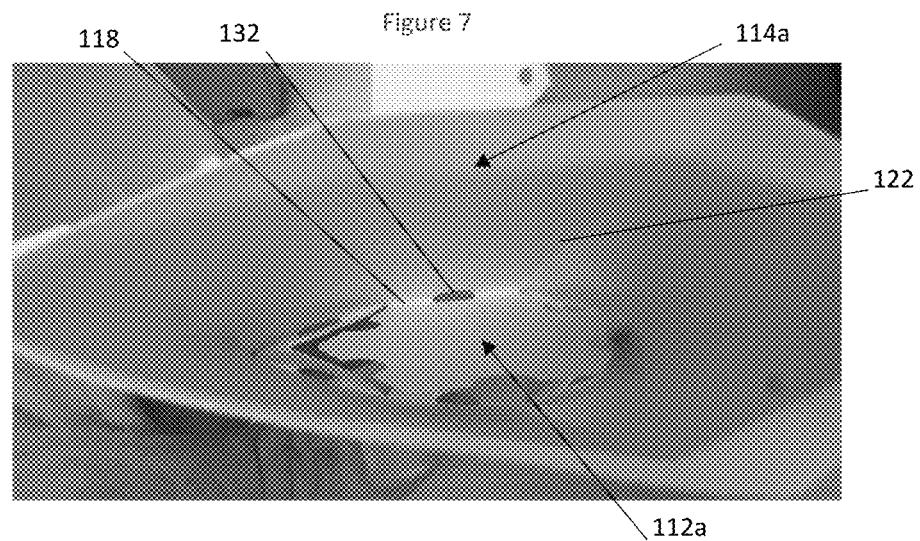
FIG. 7 is a photograph of the plant container shown in FIG. 5 that is in the process of moving from the collapsed configuration into a flattened configuration.

One of the features of the embodiment shown in FIGS. 5 and 6 is that the base wall 112a of the container is not necessarily connected to each of the second panels of the side wall 114a of the container 120. As a result, the side wall 114a of the container 120 can be moved into a flattened configuration. FIG. 7 is a photograph in which the side walls of the container 120 are in a partially flattened configuration.

Figure 8:
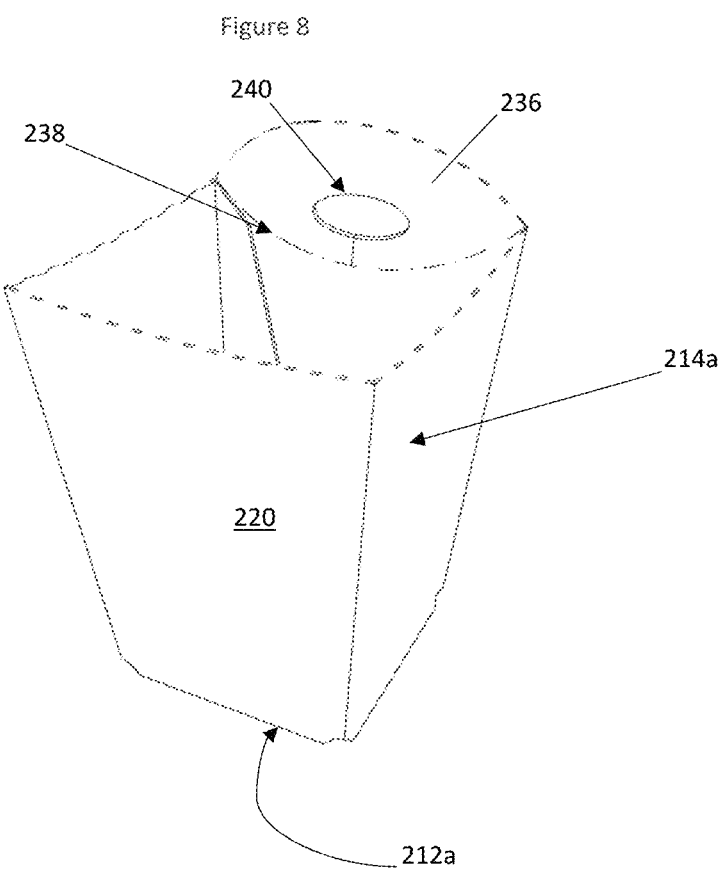
FIG. 8 is perspective view of a plant container according to an embodiment of the invention.

FIG. 8 is perspective view of a container 220 according to another embodiment and FIG. 9 is a blank 210 for making the container 220. The container 220 and blank 210 have an attachment flap 230 at one end of the line of side wall panels 214 that is attached, using a suitable adhesive, to a side wall panel 214 at the opposite end of the line of second panels to form a closed side wall that can be moved between a collapsed configuration and an erected configuration. FIG. 8 illustrates the situation in which the side wall panels 214 are in a fully erected configuration.

The base wall 212a comprises a first panel 212 that includes a set of bottom wall flaps 216, 216a and 222. The flaps 216 and the flaps 216a extend from every second side wall panel 214 and are separated from the side wall panel by first fold lines 218. The flaps 216a include tongue extensions 222. Adjacent extensions 222 and flaps 216 are glued together to form a connection in a preliminary assembly step. One of the advantages of the preliminary assembly step is that the side wall of the container can move between collapsed and erected configurations while the extensions 222 and flaps 216 are glued together by folding along a second fold line 224. When in the collapsed configuration, the container can be stored and transported flat. The container can be erected by a user by moving the side wall from the collapsed configuration to an erected configuration.

Specifically, the base wall 212a is a crush style bottom in which panels 216 and 222 are glued together and move into an operative position when the side wall moves from a collapsed position to an operative position. In the operative position, the cutouts 242 interfit, securing the bottom wall 212a in the operative position. When a plant is located in the container 220, weight on the inside of the bottom wall 212a causes the flaps 216a to fractionally engage with each other. As the load on the inside of the bottom wall 212a increases, the frictional engagement also increases.

The container 220 also includes supports 228 formed from partially cut regions on two or more side wall panels 214. In FIG. 9, the partially cut regions are located on each of the second panels 214 at or near a third fold line 226. Each partially cut region is foldable to form a tongue, tab or ear that pivots about the side wall panel 214 and extends into the container.

To remove the plant from the container 220, a user can release the attachment flap 230 from the side wall panel 214 to which it is glued and the side wall opened, suitably into a flat formation.

Although not shown in the figures, the side wall panels 214 may also have a line of weakness to facilitate opening of the container 220. The line of weakness may be provided, for example, at one of the third fold lines 226.

The side wall 214 also includes a detachable panel 236 that is connected to one of the side wall panels by a line of weakness 238. The detachable panel 236 may be of any shape, in the case of FIGS. 8 and 9 the detachable panel 236 is a scalloped shaped panel. The detachable panel 236 has a finger hold 240 for removing the detachable panel 236. Although not shown in the figures, the detachable panel 236 may have information, such as the species of the plant and care instructions including the amount of sunlight and watering recommended that are printed with an ink. It is intended that a user may remove the detachable panel from the container when the plant has been removed from the container and planted in the ground. The remainder of the container can be disposed via the usual paper recycle methods.

The blank 210 and container 220 also have drainage holes 232 that are punched into the blank 210 and the container 220 at the corners of the container 220. The drainage holes allow excess water to drain from the inside of the container.

The containers and blanks shown in the figures may include the inner paper layer and water resistant outer layers as described herein.

Figure 14:
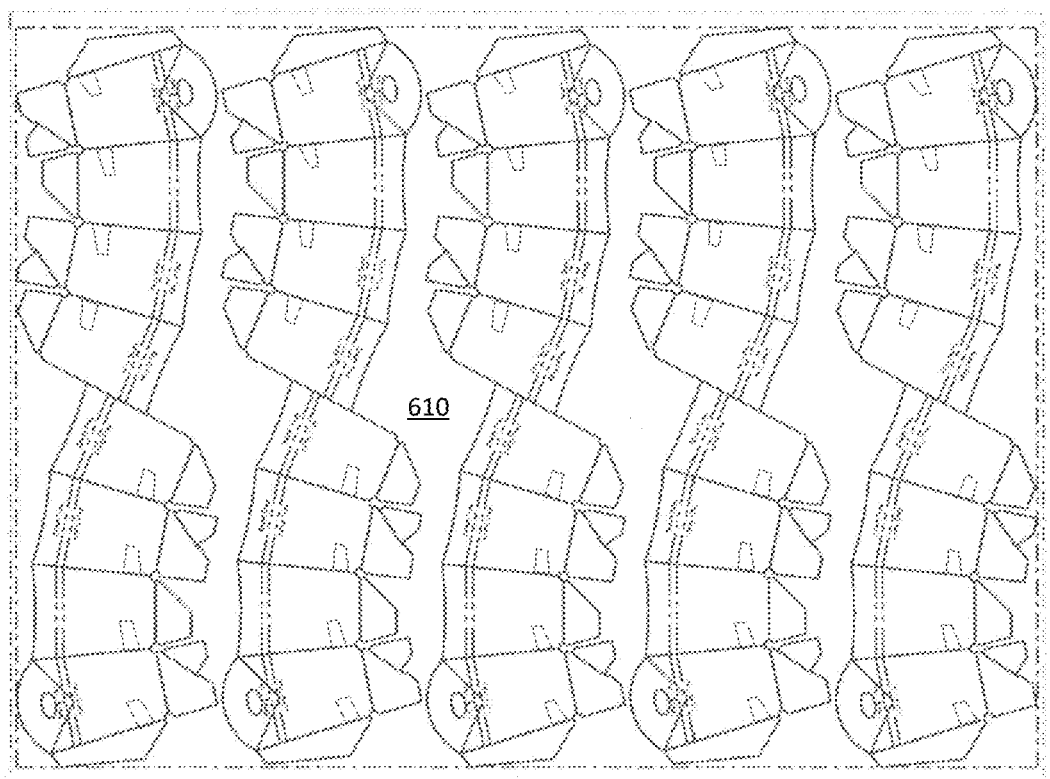

FIG. 14 exemplifies one arrangement of blanks 210 on a board 610.

FIG. 10 is a block diagram illustrating possible process steps for making a blank and container as shown in FIGS. 1 to 9. The process may include the following steps:
  i) Selecting the type of paper, and the thickness of the sheet of paper based on a notional size of the container.
  ii) Applying a water resistant coating to opposite sides of the sheet of paper to form a board. This step inhibits the ingress of water to the sheet of paper, so that the sheet of paper can retain structural rigidity while potting mix and a plant is located in the container. The water-resistant coating may be applied using any suitable technique including spraying, printing, or bonding a preformed film to opposite sides of the board. In one embodiment, the step of applying the water-resistant coating to the sheet of paper includes extruding the coating onto the sheet of paper. In another embodiment, the step of applying the water-resistant coating to the sheet of paper includes using an adhesive to fix the coating to the board. Bonding may also include physical bonding using pressure and heat to fix the coating to the board. The water resistant coating may be any suitable polymeric material including polypropylene or polyethylene. Applying the water resistant coating to the board may also include controlling the weight or grammage at which the water resistant coating is applied to the sheet of paper. The step of applying the water resistant coating to the board may include adding a pigment to the water resistant coating that forms an outer face of the board.
  iii) Treating an outer surface of the board that forms an outside face of the container. The treatment increases the surface energy, for example by a corona treatment, to increase the wettability of the board and allow printing ink to adhere to the surface.
  iv) Printing information on the board. The information printed may relate to how the container is formed from the blank, how the container is intended to be used, horticultural information relating to a plant, barcodes, prices and promotional details. This step may be carried out before or after the surface treatment step.
  v) Cutting the board to form the blank. The blanks can be printed on the board in a variety of different arrangements, some examples of which are shown in FIGS. 11 to 14. FIGS. 11, 12 and 13 provide a series of foldable blanks, of the type shown in FIG. 2, on a board and FIGS. 11a, 12a and 13a provide a series of foldable blanks, of the type shown in FIG. 2a, on a board.
  vi) Forming i) a first panel that forms at least part of a base wall of the container when erected into a container, ii) a set of second panels that extend from the first panel to form at least part of a side wall of the container when erected, and iii) a support being disposed a distance from the base wall to receive and dispose another container above the base wall when the containers are nested together, by forming pre-creased fold lines and partially perforated or cut regions on the blank. Gusset panels between the second panels and/or lines of weakness which enable the side wall of the container to be opened, or which enable a detachable panel to be removed from the side wall may also be formed.
  vii) Assembling the container. In one example, assembling the container may include partially erecting the blank by folding and attaching a gusset panel to a second panel and applying an adhesive to secure the gusset panel to an inside face of the second panel. In some embodiments, a region of the gusset panel includes an aperture for demarcating an area for receiving an adhesive to allow the gusset panel to attach the second panel using a single application of adhesive.
  In another example, assembling the container may include partially erecting the blank by securing an attachment flap of the side wall to form a closed side wall, and securing two pairs of flaps of the wall bottom wall to each other to form panels. While partially erected, the closed side wall may be moved between collapsed and erected configurations, and when in the erected configuration, the bottom flaps can engage each other.
  In another example, assembling the container may include folding the first and second panels into an operative position to form a receptacle of the container and applying an adhesive to secure the first and second panels to an inside face of the side wall to retain the first and second panels in an operative position. Optionally, flaps extending from the second panels may be oriented to form a lip formation about an opening of the container.
  viii) Extending the support inwardly to project into the container to prevent complete nesting of stacked containers. The support may project into the container during the assembling step for example when folding the gusset panel relative to the second panel or when adhering the gusset panel to the second panel. Alternatively, the support may project into the container by folding the partially perforated or cut regions of the second panel.

The process may include a step of forming a water-resistant composition by mixing a biodegradable material additive with a polymer mixture to form an extrudable composition. Suitably, the biodegradable material additive is added in an amount ranging from 1-3 wt % of the polymer mixture. More suitably, the additive is added in an amount of about 2 wt % of the polymer mixture.

The biodegradable material additive may be applied to the resin bead through normal masterbatch blending. This forms a homogenous mixture composition that is extrudable to form the water resistant layer.

The step of applying a water resistant coating to opposite sides of the sheet of paper may include a step of extruding the homogeneous mixture composition onto the sheet of paper.

The extrusion step may be performed at a temperature ranging from 250 C-300° C. Suitably, the extrusion step is performed at a temperature ranging from 260-285° C. Operating under these temperature ranges minimises degradation of the additive.

The step of applying the extruded composition onto the sheet of paper may be performed under one or more of the following conditions:

1. A chill roll temperature ranging from 20-30° C. Suitably, the chill roll temperature is about 25° C.
2. An air gap ranging from 240-260 mm. Suitably, the air gap is about 250 mm.
3. Laydown of curtain in the laminator towards the fibre side ranging from 20-30%. Suitably, the laydown is about 25%.
4. Run speed reduction ranging from 20-30%. Suitably, the run speed reduction is about 25%.

When one fully erected container is stacked inside another, the nesting container rests on the supports such that the base wall of the nesting container is preventing from contacting the base wall of the receiving container. Ideally, the plant container can be folded flat and disposed in a normal refuse bin, so that it degrades with the other standard waste.

Ideally, the plant container can be recycled with other paper recyclable material using conventional recycling equipment, such as a hydro-pulper. It will be understood by persons skilled in the art of the invention that many modifications may be made to the embodiment described herein without departing from the spirit and scope of the invention.

Although not shown in the figures, the container and blank for making the container may have a number of different tear away or pop out panels or holes on one or more sides of the container. The tear away or pop out panels can be removed to allow, promote and accommodate sideways root growth.

The invention claimed is:

1. A plant container constructed from a foldable board, the plant container including:
   a base wall,
   a side wall that extends from the base wall to form a receptacle configured to receive potting mix, and
   a support extending inwardly from the side wall and spaced a distance above the base wall, wherein the support has a free end that extends into the container and is configured to receive and space another container above the base wall when the containers are nested together.

2. The plant container of claim 1, wherein the side wall comprises a plurality of side wall panels, wherein the support is located about a fold line located between two side wall panels.

3. The plant container of claim 1, comprising a pair of opposed, typically diametrically opposed, supports.

4. The plant container of claim 1, wherein adjacent side wall panels are interconnected by a gusset panel on which the support is located.

5. The plant container of claim 4, wherein the gusset panel is separated into two sections by a fold line, wherein the support is located on a first section of the gusset panel.

6. The plant container of claim 5, wherein the gusset panel further includes an aperture for an adhesive in a second section of the gusset panel that enables the gusset panel to be connected to a side panel via a single point of attachment when the gusset panel is folded.

7. The plant container of claim 1, wherein the support is in the form of a tongue, a tab or ear formed from a partially cut or perforated region of the side wall.

8. The plant container of claim 1, wherein the foldable board is a laminated board with an inner paper layer and water-resistant layers on opposite sides of the inner paper layer.

9. The plant container of claim 8, wherein the inner paper layer is a paper board material having a thickness ranging from 350 to 750 μm.

10. The plant container of claim 8, wherein at least one of the water resistant layers is made of a polymeric film.

11. The plant container of claim 10, wherein the polymeric film is one of a polypropylene film (PP) including BOPP film, a polyethylene film (PE) including low density polyethylene (LDPE) film and/or high density polyethylene (HDPE) film, a polyester film, a nylon film, or a film comprising polymers derived from plant materials such as corn and sugar cane.

12. The plant container of claim 8, wherein at least one of the water resistant layers comprises a LDPE/HDPE blend ranging from 25 wt. % of LDPE/27 wt. % of HDPE to 72 wt. % of LDPE/25 wt. % of HDPE.

13. The plant container of claim 8, wherein at least one of the water resistant layers has a thickness ranging from 10 μm to 35 μm.

14. The plant container of claim 8, wherein at least one of the water resistant layers includes a pigment.

15. The plant container of claim 14, wherein the pigment comprises 8 to 15 wt. % titanium dioxide.

16. The plant container of claim 8, wherein at least part of the foldable board comprises a plant derived additive.

17. The plant container of claim 16, wherein the plant derived additive comprises at least one of polybutylene succinate, a mixture of aliphatic aromatic esters and polylactide, organoliptic, monosaccharides and aldohexose compositions, or biobased or renewable bioplastic polymers including greenLDPE, PLA, PET and PTT polymers.

18. A foldable blank for making a plant container, the blank including:
   a first panel that forms at least a part of a base wall of the container when erected into a container, and
   a set of second panels that extend from the first panel to form a side wall of the container, and when assembled, the second panels and the first panel form a receptacle for receiving potting mix, wherein the blank includes a region spaced from the first panel that is foldable to form a support having a free end that extends into the container and is configured to receive and dispose another container a distance from the base wall.

19. The foldable blank of claim 18, wherein the support is located about a fold line located between two second panels.

20. The foldable blank of claim 18, wherein adjacent side wall panels are interconnected by a gusset panel on which the support is located.

21. The foldable blank of claim 20, wherein the gusset panel is separated into two sections by a fold line, wherein the support is located on a first section of the gusset panel.

22. The foldable blank of claim 21, wherein the gusset panel further includes an aperture for an adhesive in a second section of the gusset panel that enables the gusset panel to be connected to a side panel via a single point of attachment when the gusset panel is folded.

23. The foldable blank of claim 18, wherein the support is in the form of a tongue, a tab or ear formed from a partially cut or perforated region of the blank.

24. A process of making a plant container from a foldable board, the process including:

cutting a blank from the foldable board;

forming i) a first panel that forms at least part of a base wall of the container when erected into a container, ii) a set of second panels that extend from the first panel to form at least part of a side wall of the container when erected, and iii) a support having a free end that extends into the container, said support being disposed a distance from the base wall to receive and dispose another container above the base wall when the containers are nested together, on the blank;

folding the second panels relative to the first panel into an operative position to form a receptacle for receiving potting mix; and extending the support inwardly from the side wall into the container.

25. The process of making a plant container of claim 24, wherein the forming step includes partially cutting a region of a panel of the side wall to form a tab, tongue or ear to form the support.

26. The process of making a plant container of claim 24, wherein the forming step includes forming fold lines that form a gusset panel between adjacent second panels.

27. The process of making a plant container of claim 26, wherein the forming step includes folding the gusset panel relative to the second panel to extend the support from the side wall.

28. The process of making a plant container of claim 26, wherein the folding step includes forming an aperture for an adhesive on the gusset panel that enables the gusset panel to be connected to a second panel via a single point of attachment when the gusset panel is folded.

* * * * *